Aug. 1, 1950     F. X. LAMB     2,517,216
CONCENTRIC INDICATOR, FILAR GEARED
ELECTRICAL MEASURING INSTRUMENT
Filed Feb. 27, 1947
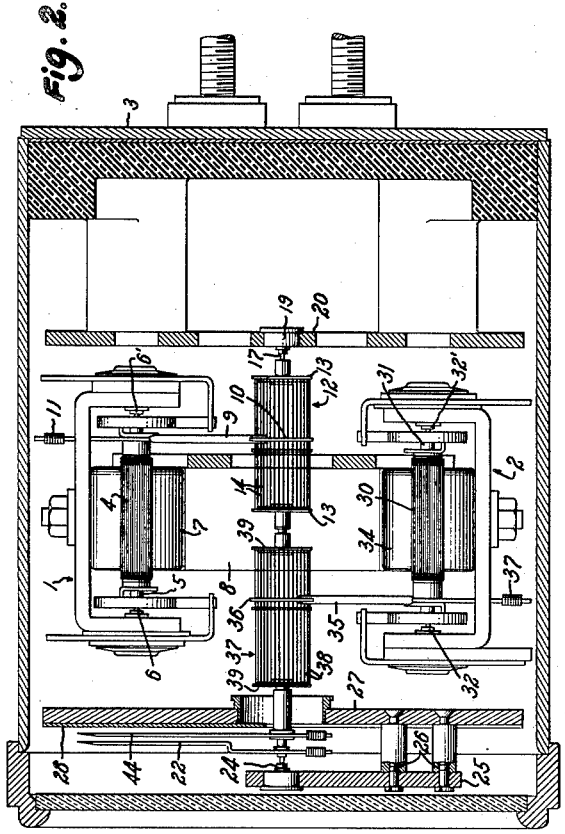
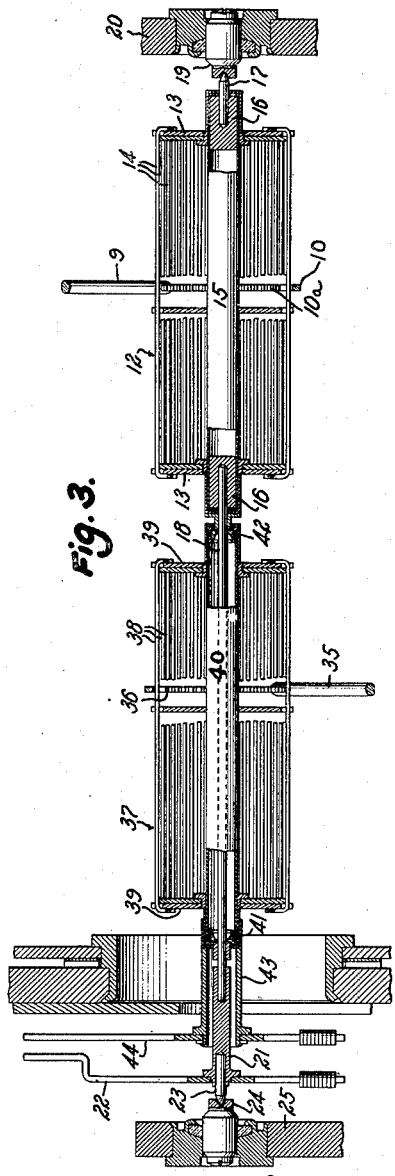
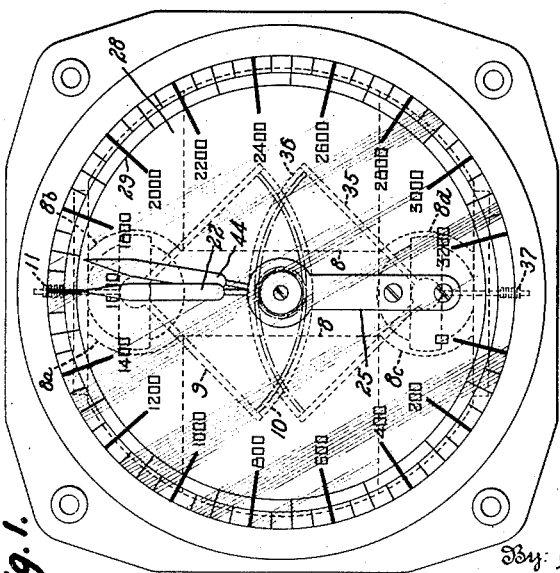
Inventor:
Francis X. Lamb,
By: Pierce, Scheffler & Parker,
Attorneys.

Patented Aug. 1, 1950

2,517,216

UNITED STATES PATENT OFFICE 2,517,216

CONCENTRIC INDICATOR, FILAR GEARED ELECTRICAL MEASURING INSTRUMENT

Francis X. Lamb, East Orange, N. J., assignor to Weston Electrical Instrument Corporation, Newark, N. J., a corporation of New Jersey Application February 27, 1947, Serial No. 731,273

2 Claims. (Cl. 171—95)

This invention relates to measuring instruments and in particular to those of the sensitive electrical type employing a rotor such as a coil which rotates in an electro-magnetic field in accordance with the magnitude of the coil current.

An object of the invention is to provide a dual element electrical measuring instrument in which the relative angular displacement of the two electro-sensitive elements may be instantly and most accurately compared on a common scale by means of a pair of concentrically mounted pointers. Another object is to provide an electrical measuring instrument having dual moving systems that is compact and of small overall dimensions but which nevertheless affords considerable amplification of the angular displacement of the electro-sensitive element of each moving system as read on the instrument scale thereby making it much easier to compare the relative positions of the pointers and also improving the accuracy of the scale reading. Another object is to provide an electrical measuring instrument having a pair of independent moving systems of the extremely sensitive type such as a coil or vane and the like operating in a magnetic field and a pointer driven thereby, the instrument pointers being mounted concentrically for rotation over a common scale and coupled to the coils through gearing which permits an amplified angular displacement of the pointers with respect to the coils.

Yet another object is to provide a dual element indicating device of the electrical instrument type that includes a pair of concentrically mounted pointers which work over a common scale, the pointers being driven respectively from separate electro-sensitive elements through angular motion-multiplying gearing having low transmission losses of the general type described in my prior U. S. Patent No. 2,313,444, issued March 9, 1943, whereby the relative current inputs to the two sensitive elements may be instantly compared over a large deflection angle on the same scale.

These and other objects and advantages of the invention will become more apparent from the following detailed description when considered with the accompanying drawings which illustrate an application of the principles of the invention to a dual element electrical speed indicator for use on twin engine aircraft and the like where it is desired to indicate and compare the relative speeds of the two engines. However the illustrated embodiment is to be understood as typical only of the many possible different applications to which the improved instrument mechanism may be put, all of which are intended to be embraced in the scope of the claims appended hereto.

In the drawings, Fig. 1 is an end elevation of a preferred construction of the multiple element instrument; Fig. 2 is substantially a longitudinal vertical section with certain of the working parts shown in elevation for clearness; and Fig. 3 is an enlarged detail showing the construction by which the pointers are concentrically mounted.

Referring now to the drawings, it is seen that the multiple element instrument is comprised of a pair of instrument mechanisms 1 and 2 mounted vertically one above the other and supported within a casing 3. The mechanism designated 1 is comprised of a wire wound, substantially rectangular, coil type rotor 4 mounted upon a staff 5 which is received at each end in adjustable jewelled bearings 6 and 6'. A cylindrical core 7 lies within coil 4 and the latter rotates within the magnetic field set up across poles 8a, 8b of a double permanent magnet assembly 8.

A generally Y-shaped member 9 is secured intermediate its ends on the staff 5, and spanning the downwardly extending outer ends of the arms of this member which define an included angle of approximately 90°, is a gear sector 10 having internal teeth 10a. An adjustable weight 11 threaded onto the base end of the Y member 9 is provided to balance the member about the axis of staff 5.

Gear sector 10 is meshed with a filar gear 12 which includes spaced end flanges 13 and resilient tooth elements 14 of silk or a synthetic resin such as nylon stretched between the flanges. As shown clearly in the enlarged detail view of Fig. 3, filar gear 12 is carried by a shaft 15 which extends through the end flanges 13, the shaft being hollow throughout most of its length to reduce the mass of the instrument's moving system. Plugs 16 anchored in opposite ends of shaft 15 each carry one end of staffs 17, 18 extending axially in opposite directions. Staff 17 is received in an adjustable jewelled bearing 19 carried by a vertical support 20 while staff 18 terminates in a press fit within one end of an axially aligned shaft 21 on which is mounted a balanced pointer 22. A stub staff 23 extending axially from the opposite end of shaft 21 is received in an adjustable jewelled bearing 24 supported by a bridge 25. The latter is secured by studs 26 to a circular plate 27 that forms a backing for scale plate 28 having graduations 29, and hence it will now be evident that as coil 4 is displaced angularly in accordance with the current sent through it, such motion will be transmitted via sector gear 10 to filar gear 12 causing the latter and hence staffs 18, 21 and pointer 22 to rotate over scale plate 28.

The limit of the angular displacement of coil 4 in the illustrated construction is somewhat less than 90°. However, due to the angular motion-multiplying filar and sector gear arrangement, the angular displacement of pointer 22 may exceed 360° depending upon the ratio of the gear transmission. In the illustrated construction, the ratio of angular displacement of filar gear 12 to that of coil 4 is such that pointer 22 will be displaced approximately 330° from zero position for full deflection of coil 4.

The other and independently operated instrument mechanism 2 as shown in Fig. 2 is similar to mechanism 1 and includes a rectangular coil 30 disposed below coil 4 and similarly mounted on a staff 31 received at each end in adjustable jewelled bearings 32, 32'. A stationary core 34 is supported within coil 30 and the latter rotates on its axis within the magnetic field set up across two other poles 8c, 8d of the other half of the permanent magnet assembly 8.

A second Y-shaped member 35 having an internally toothed gear sector 36 and balance weight 37 is secured to staff 31 for rotation therewith. Gear sector 36 extending upwardly from staff 31 is meshed with a second filar gear 37 of the same construction as gear 12 having resilient tooth strands 38 secured at their opposite ends to flanges 39.

Referring again to Fig. 3, filar gear 37 is carried by a hollow shaft 40 that extends through the end flanges 39 and which is in turn mounted concentrically on staff 18 by ring bearings 41, 42 located in opposite ends of shaft 40. A sleeve 43 forming an axial extension of shaft 40 carries a pointer 44 and hence this pointer rotates as the sector gear 36 drives filar gear 37 upon displacement of coil 30.

The pairs of poles 8a—8b and 8c—8d of the magnet assembly 8 are so poled and the relative directions of current flow through the coils 4 and 30 are so chosen that the coils rotate in the same relative direction, which is clockwise when viewed from the front elevation of Fig. 1. Hence pointers 22 and 44 will both rotate in a clockwise direction from their zero scale position in accordance with the magnitude of the respective currents sent through their associated coils 4 and 30. It is apparent the direction of current flow through one of the coils can be reversed whereby the pointers will rotate in opposite directions to provide readings on either side of a zero position located at, say, the midpoint of the scale range.

In the illustrated embodiment of the invention, it is contemplated that the dual pointer instrument will be used in a dual engine aircraft for indicating the speed in revolutions per minute of a pair of engines. Hence as shown in Fig. 1, the dial scale is graduated in steps of 50 R. P. M. from 0 to 3200, the pointers each having an angular travel of 330° from the zero speed position. The circuits for supplying speed-responsive voltages to the respective instrument mechanisms 1 and 2 are not illustrated as they form no part of the invention and preferably conform to current practice in the electrical tachometer art.

It is common knowledge that the moving coils of the permanent magnet type of electrical measuring instrument which has been described are most sensitive and have a very low driving torque. The filar gearing transmission associated with each of the coils 4 and 30 provides however a most desirable amplification of the coil displacement without imposing any substantial loading on the coils and hence the respective angular motions of coils 4 and 30 are translated to the pointers 22 and 44 with a high degree of precision.

The filar gears 12 and 37, and their meshed sector driving gears, 10 and 36 are preferably made in accordance with the construction described in my copending application Ser. No. 700,574, filed October 1, 1946, now Patent No. 2,502,160, issued March 28, 1950. However, the gear transmission may be as described in my previously granted U. S. Patent No. 2,313,444 issued March 9, 1943.

In conclusion it will be evident that the dual movement indicating instrument construction described wherein the movements are mounted in vertical alignment with the driver gear sectors extending towards each other and meshed with axially aligned filar gears results in a most compact instrument of small over-all dimensions that makes it most desirable especially when used on aircraft instrument panelboards where space is a prime factor in view of the large number of indicating instruments on the board. The invention, however, is obviously not to be limited to speed indicators but can be applied equally as well for comparing the relative magnitudes of other measured variables such as temperature, pressure, liquid level, etc. Also it will be understood that various changes in the construction and arrangement of parts of the illustrated embodiment may be made without departing from the spirit and scope of the appended claims.

I claim:

1. In a dual indicator type electrical measuring instrument the combination comprising a pair of spaced parallel movements each of which includes a rotor and an associated magnetic field system, a pair of telescopically arranged and independently rotatable pointer shafts located between said movements and arranged parallel with the rotor elements thereof, a filar gear secured upon each shaft, a counterbalanced driver gear associated with each rotor and driven thereby, said driver gears being gear sectors extending towards each other and meshed respectively with said filar gears and having a pitch diameter substantially greater than that of said filar gears, a pointer attached to each shaft, and a scale plate over which said pointers are angularly displaced.

2. In a dual indicator type electrical measuring instrument, the combination comprising a pair of spaced parallel movements each of which includes a rotor and an associated magnetic field system, a concentric dual pointer shaft system journalled in jewelled bearings, the shafts of said system being telescopically arranged and independently rotatable, said shaft system being located between said movements and arranged parallel with the rotor elements thereof, a filar gear secured upon each shaft, a counterbalanced driver gear associated with each said rotor and driven thereby and meshed respectively with said filar gears, said driver gears being internally toothed gear sectors extending towards each other and embracing the filar gear meshed therewith and having a pitch diameter substantially greater than that of said filar gears, a pointer attached to each shaft, and a scale plate over which said pointers are angularly displaced.

FRANCIS X. LAMB.

REFERENCES CITED

The following references are of record in the file of this patent:

UNITED STATES PATENTS

| Number | Name | Date |
|---|---|---|
| 600,981 | Weston | Mar. 22, 1898 |
| 1,518,332 | Kloneck | Dec. 9, 1924 |
| 1,960,241 | Deerwester | May 29, 1934 |

FOREIGN PATENTS

| Number | Country | Date |
|---|---|---|
| 12,527 | Great Britain | May 29, 1913 |
| 59,592 | Austria | June 10, 1913 |
| 256,447 | Germany | Feb. 11, 1913 |